United States Patent
Soundrarajan

(10) Patent No.: US 11,115,287 B2
(45) Date of Patent: Sep. 7, 2021

(54) SYSTEM AND METHOD FOR PREDICTING KEY PERFORMANCE INDICATOR (KPI) IN A TELECOMMUNICATION NETWORK

(71) Applicant: HCL TECHNOLOGIES LIMITED, Uttar Pradesh (IN)

(72) Inventor: Rahul Soundrarajan, Bengaluru (IN)

(*) Notice: Subject to any disclaimer, the term of this patent is extended or adjusted under 35 U.S.C. 154(b) by 83 days.

(21) Appl. No.: 16/235,433

(22) Filed: Dec. 28, 2018

(65) Prior Publication Data
US 2020/0213202 A1    Jul. 2, 2020

(51) Int. Cl.
*H04L 12/24* (2006.01)
*H04L 12/26* (2006.01)
*H04W 24/08* (2009.01)

(52) U.S. Cl.
CPC ........ *H04L 41/142* (2013.01); *H04L 41/5009* (2013.01); *H04L 43/024* (2013.01); *H04L 43/04* (2013.01); *H04L 43/06* (2013.01); *H04L 43/08* (2013.01); *H04L 43/14* (2013.01); *H04W 24/08* (2013.01)

(58) Field of Classification Search
CPC ....... H04L 43/08; H04L 43/16; H04L 41/147; H04L 43/0811; H04L 65/1006; H04L 65/80; H04L 43/06; H04L 43/14; H04L 41/142; H04L 41/5009; H04W 24/02; H04W 24/08; H04W 36/245; H04W 84/042
See application file for complete search history.

(56) References Cited

U.S. PATENT DOCUMENTS

| | | | |
|---|---|---|---|
| 9,031,561 B2 | 5/2015 | Nuss et al. | |
| 9,325,568 B2 | 4/2016 | Racz et al. | |
| 9,491,285 B2 | 11/2016 | Vaderna et al. | |
| 2003/0096606 A1 | 5/2003 | Inman et al. | |
| 2013/0290525 A1* | 10/2013 | Fedor | H04L 41/147 709/224 |
| 2014/0066052 A1* | 3/2014 | Chang | H04L 43/08 455/423 |
| 2015/0296395 A1 | 10/2015 | Vaderna et al. | |
| 2016/0277946 A1* | 9/2016 | Sofuoglu | H04W 28/18 |
| 2017/0034720 A1* | 2/2017 | Gopalakrishnan | H04W 24/08 |
| 2017/0290024 A1* | 10/2017 | Ouyang | H04W 24/08 |
| 2018/0045519 A1* | 2/2018 | Ghadiok | G01C 21/30 |

(Continued)

*Primary Examiner* — Tonia L Dollinger
*Assistant Examiner* — Linh T. Nguyen
(74) *Attorney, Agent, or Firm* — Kendal Sheets

(57) ABSTRACT

The present disclosure relates to system(s) and method(s) for predicting a Key Performance Indicator (KPI) in a telecommunication network is illustrated. The system is configured to monitor a set of counters and a Key Performance Indicator corresponding to a telecommunication network. The set of counters and the Key Performance Indicator (KPI) are monitored for a predefined time interval to gather sample data. The system is configured to analyze the sample data using a data analysis technique in order to identify a subset of counters, from the set of counters, influencing the KPI and a correlation coefficient associated with each counter from the subset of counters, wherein the correlation coefficient associated with each counter is identified after normalizing the subset of counters. The system is configured to apply regression on the subset of counters and the KPI in order to build a correlation equation between the subset of counters and the KPI.

13 Claims, 4 Drawing Sheets

(56) References Cited

U.S. PATENT DOCUMENTS

| | | | |
|---|---|---|---|
| 2019/0159048 A1* | 5/2019 | Feldkamp | H04L 41/145 |
| 2019/0239101 A1* | 8/2019 | Ouyang | H04W 24/04 |
| 2020/0027047 A1* | 1/2020 | Harris | G06Q 10/06393 |
| 2020/0059800 A1* | 2/2020 | Menon | H04L 43/16 |
| 2020/0202277 A1* | 6/2020 | Zhu | G06F 9/5016 |

* cited by examiner

SYSTEM AND METHOD FOR PREDICTING KEY PERFORMANCE INDICATOR (KPI) IN A TELECOMMUNICATION NETWORK

CROSS-REFERENCE TO RELATED APPLICATIONS AND PRIORITY

The present application does not claim priority from any patent application.

TECHNICAL FIELD

The present disclosure in general relates to the field of data processing. More particularly, the present invention relates to a system and method for predicting Key Performance Indicator (KPI) in a telecommunication network.

BACKGROUND

In any complex system involving multiple entities, interfaces, subsystems with each having counters, alarms and logs, the health of the system is generally defined using indicators/Key Performance Indicators (KPIs). These KPIs are calculated by pre-defined arithmetic done on performance counters. Depending on the nature of the system, KPIs come in different flavors—some are standardized such as Call Setup Success Rate in a wireless network system and some are non-standardized such as a ratio of transmitted v/s dropped packets on a proprietary interface. A simple example of a KPI is illustrated in table 1.

TABLE 1

PMs and KPI

| PM (Performance Management) Counter Name(Indicative) | PM (Performance Management) Counter Definition | PM (Performance Management) Counter Type |
|---|---|---|
| Call_Att | Number of Calls attempted per hour | Event-based (pegged/incremented by 1 every time a call is attempted |
| Call_Succ | Number of Calls of successful calls per hour | Event-based |
| Call_Fail | Number of Calls Failed in one hour | Event-based |

A simplified KPI Formula for call setup success rate is represented as equation 1, whereas an actual KPI formula from 3GPP 32.814 is represented in equation 2.

KPI: Call Setup Success Rate(Abstracted)=Call_Succ/Call_Att  Equation (1)

| | |
|---|---|
| Long name | a) RRC connection establishment success rate |
| Short name | a) RrcEstabSR |
| Description | This KPI describes the ratio of successful RRC connection establishments related to the total number of RRC connection establishment attempts. |
| Formula | $$RrcEstabSR = \frac{\sum_{cause} RRC.SuccConnEstab.[cause]}{\sum_{cause} RRC.AttConnEstab.[cause]}$$  Equation (2) |
| Counters | The respective causes are detailed in 3GPP [2]<br>RRC.AttConnEstab.Cause<br>RRC.SuccConnEstab.Cause |
| Object | UtranCell |
| Unit/Range | Range |
| Type | RATIO |
| Remark | The RRC Connection Attempts are excluding multiple repetitions of RRC Connection Attempts from the same UE in order to correctly reflect the RRC Connection establishment rate from an UE perspective. The RRC Connection Request to be considered in this KPI is the first RRC Connection Request for a UE. |

Monitoring KPIs gives a continuous idea of the health of a system. KPIs are generally associated with thresholds that provide a certain tolerance or range. As long as the KPIs are within this range, the system is healthy. When KPIs go beyond this tolerance (for a considerable amount of time), it implies the system is unstable and therefore there is a problem. A certain change in the system parameters is required to recover the KPI.

Generally, there is a trigger to make the system go out of stability. For example a software upgrade, a hardware fault, an increase in incoming volume (which could be dependent on another underlying cause) and so on. In some cases such as a hardware reset/fault, the KPI may generally recover on its own once the system stabilizes. But in other cases such as a software upgrade or a feature turn ON, the situation moves on to a complex set of possibilities or trade-offs that SMEs (Subject-Matter-Experts) need to delve into in order to ensure the KPIs recover despite the presence of this change (software upgrade, feature turn ON etc.)

Some of the key challenges behind this KPI troubleshooting are:
  KPIs are inter-connected and it is not possible to isolate a single KPI for troubleshooting. So changing parameters to recover a KPI is almost like solving a RUBIK's cube, it may improve one KPI but compromise others.
  SMEs only have an aggregated view of the PMs and KPIs and this poses a challenge. For example, a failure counter may get pegged a hundred times in a few seconds but a user only gets an aggregated view of the counter over a period of 5 minutes or 15 minutes. In a millisecond break-up view a user may be able to see the overshoot of one counter leading to pegging of another related failure counter and so forth showing a cascading of effects. But, in an aggregated view, the user only gets to see what happened after the observation window (of 5 min for example) is over.

SMEs generally have a view of how PMs are related to a KPI by their formula as shown above in equation 1 and 2 or by functional association through connecting concepts via call flows/ladder diagrams. An SME therefore looks for a functional flow or a cascading pattern of failures which can trace back to a root cause. However, during a problem, a view representing correlation between KPIs and counters is desired.

SMEs over the years have developed systematic approaches to troubleshooting but there are no standard techniques available to do a complete KPI assessment.

The aggregated view of PM counters (as explained earlier) gives only a snapshot or trails of KPI degradation but no insight into causation. The trails are generally seen as pegging of certain bunch of counters. So establishing a cause-effect relationship is a very convoluted procedure i.e. to bridge the gap between "Causation" and "Correlation" by hypotheses. The breadth and depth of these hypotheses is only limited by the SME's knowledge and intuition.

Even though the approach to solve a problem may be systematic, the confidence behind the solution is strongly left to what-was-investigated and what-was-left-out. There is a certain doubt about implications of counters, logs and data that got overwritten or overseen.

More importantly, in a system like a "Wireless Network" which is an agglomeration of multiple technologies, network KPIs have multi-layer, multi-tech dependencies. For example, a Call-Drop KPI in a wireless ecosystem could be due to any one of Radio, Bandwidth, Processor Occupancy, Capacity, or a software problem. Such a complex system comes with its own challenges and combined with the increase in Wireless telephony, TSPs and OEMs are under constant pressure to keep the wireless system performing at its best.

It is in this context that this invention attempts to submit ways and means to TSPs and OEMs to employ their OPEX more effectively to improve Network Operations.

KPI Prediction and its need:

Given this kind of complexity in a troubleshooting exercise, prediction of KPIs becomes almost impossible.

Prediction or forecasting KPIs is important because network level activities bank on it. These are situations when changes at the network or on the mobile-handset are planned to be played out but the TSP would like to know its exact impact so as to take preventive steps. A few scenarios are:

The call volumes in a cell will decrease by 10% owing to the activation of a particular feature on the network side. So what would be the impact on Call Success KPI?

The neighboring cell will increase the coverage (power) by 10%, will there be an improvement in the Call Drop KPI?

A power-saving feature will be enabled on the mobile phone OEM chipset making the mobile phone release its resources 10% earlier. Will this result in unused capacity on the cell?

Given the technical challenge in KPI troubleshooting, it follows that predicting/forecasting KPIs is a very uphill and convoluted task though it is a very important and necessary one. With this background, a system to use Data Science in such a way that SMEs have more qualitative and quantitative insights into KPI trends and thereby build models to address the challenge of KPI prediction/forecast is desired.

SUMMARY

Before the present systems and method for predicting Key Performance Indicator (KPI) in a telecommunication network is illustrated, it is to be understood that this application is not limited to the particular systems, and methodologies described, as there can be multiple possible embodiments that are not expressly illustrated in the present disclosure. It is also to be understood that the terminology used in the description is for the purpose of describing the particular versions or embodiments only, and is not intended to limit the scope of the present application. This summary is provided to introduce concepts related to systems and method for predicting Key Performance Indicator (KPI) in the telecommunication network. This summary is not intended to identify essential features of the claimed subject matter nor is it intended for use in determining or limiting the scope of the claimed subject matter.

In one implementation, a system for predicting Key Performance Indicator (KPI) in a telecommunication network is illustrated. The system comprises a memory and a processor coupled to the memory, wherein the processor is configured to execute programmed instructions stored in the memory to monitor a set of counters and a key performance Indicator, corresponding to a telecommunication network. The set of counters and a Key Performance Indicator (KPI) is monitored for a predefined time interval to gathering sample data. Further, the processor is configured to execute programmed instructions stored in the memory to analyse the sample data using a data analysis technique in order to identify a subset of counters, from the set of counters, influencing the KPI and a correlation coefficient associated with each counter from the subset of counters, wherein the correlation coefficient associated with each counter is identified after normalizing the subset of counters. Further, the processor is configured to execute programmed instructions stored in the memory to apply regression on subset of counters and the KPI in order to build a correlation equation between the subset of counters and the KPI.

In one implementation, a method for predicting Key Performance Indicator (KPI) in a telecommunication network is illustrated. The method may comprise steps to monitor a set of counters and a key performance Indicator, corresponding to a telecommunication network. The set of counters and a Key Performance Indicator (KPI) is monitored for a predefined time interval to gathering sample data. The method may further comprise steps to analyse the sample data using a data analysis technique in order to identify a subset of counters, from the set of counters, influencing the KPI and a correlation coefficient associated with each counter from the subset of counters, wherein the correlation coefficient associated with each counter is identified after normalizing the subset of counters. The method may further comprise steps to apply regression on subset of counters and the KPI in order to build a correlation equation between the subset of counters and the KPI.

In yet another implementation, a computer program product having embodied computer program for predicting Key Performance Indicator (KPI) in a telecommunication network is disclosed. The program may comprise a program code to monitor a set of counters and a key performance Indicator, corresponding to a telecommunication network. The set of counters and a Key Performance Indicator (KPI) is monitored for a predefined time interval to gathering sample data. The program may comprise a program code to analyse the sample data using a data analysis technique in order to identify a subset of counters, from the set of counters, influencing the KPI and a correlation coefficient associated with each counter from the subset of counters, wherein the correlation coefficient associated with each counter is identified after normalizing the subset of counters. The program may comprise a program code to apply regression on subset of counters and the KPI in order to build a correlation equation between the subset of counters and the KPI.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
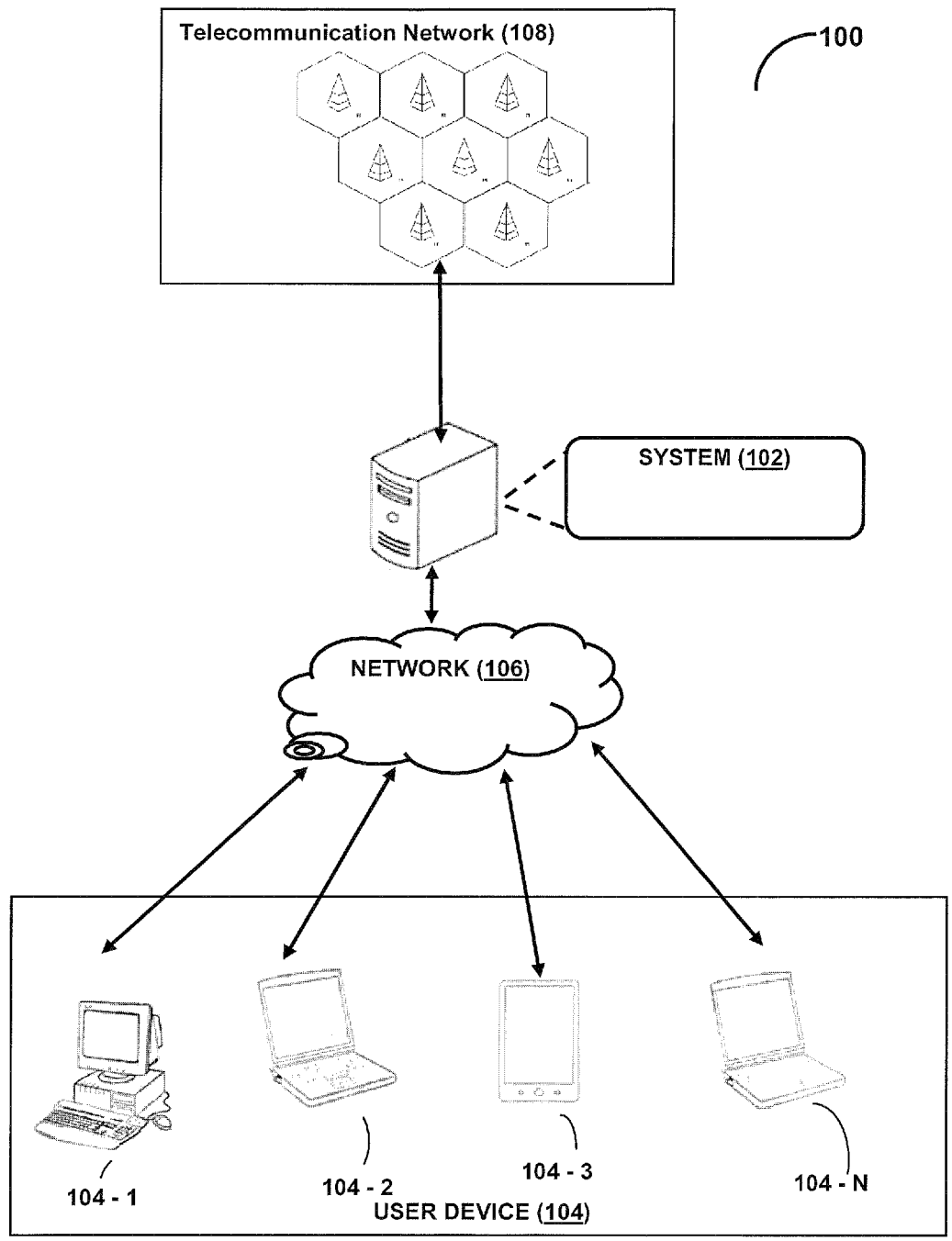
FIG. 1 illustrates a network implementation of a system configured for predicting a Key Performance Indicator (KPI) in a telecommunication network, in accordance with an embodiment of the present subject matter.

Some embodiments of the present disclosure, illustrating all its features, will now be discussed in detail. The words "monitoring", "analysing", "identifying", "applying", and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in predicting Key Performance Indicator (KPI) in a telecommunication network, the exemplary, systems and method for pre-processing of the image is now described.

Various modifications to the embodiment will be readily apparent to those skilled in the art and the generic principles herein may be applied to other embodiments. However, one of ordinary skill in the art will readily recognize that the present disclosure for predicting Key Performance Indicator (KPI) in a telecommunication network is not intended to be limited to the embodiments illustrated, but is to be accorded the widest scope consistent with the principles and features described herein.

The system enables predicting Key Performance Indicator (KPI) in a telecommunication network. In one embodiment, the system is configured to identify concepts that are problematically connected. This is made possible by applying Statistical and Machine Learning methods on "Performance Management" counters. A typical 'Call-Drop' KPI in a 3G wireless cell-site (NodeB) is taken as an example to explain the methods of this invention. The data (PM counters) captured from the telecommunication network shows a certain correlation and the system is configured to include all PM counters and use the right (combination of) techniques to bring out the right underlying contributors of each counter.

For this purpose, initially the system is configured to select KPI-of-interest based on user inputs. In one embodiment, the system may analyse the data captured from the telecommunication network to determine one or more vulnerable KPIs. For example, a Call-Drop KPI for the cell-of-interest in a telecommunication network may be selected by the system.

In the next step, the system 102 is configured to identify key (counters) contributors for the call-Drop KPI. Further, the system is configured to sort out the top 'n' influencing counters that influence a Call-Drop KPI, using correlation and covariance techniques. This reveals both positive and negative correlations between underlying indicators/PMs with Call-Drop KPI. Correlation and covariance yield the best results because it is purely data-driven (not depending on counters within the KPI formula) and the span/range of variation gets accounted for in the KPI-of-interest.

The table 2 shows the output of correlation applied to the Call-Drop KPI. This is the top-7 picked out of more than 200 other counters. The mean (average) values of these top-7 counters considered for Call-Drop KPI for one cell-of-interest.

TABLE 2

| | Top-7 counters (anonymized samples) that correlate with Call-Drop KPI | | | | |
|---|---|---|---|---|---|
| Date Time | PSCall-Drop | HSDmobHSDToHSD | HSDIuRelmobFailure | RBReconfigFailure | RrcReEstAttemptPSDLRlcUncErr |
| 12/30/20xx | 6.74 | 269 | 290 | 488 | 306 |
| 12/31/20xx | 1.82 | 239 | 257 | 425 | 351 |
| 1/1/20xx | 3.67 | 261 | 272 | 430 | 300 |
| 1/2/20xx | 8.53 | 469 | 488 | 825 | 459 |
| 1/3/20xx | 6.91 | 428 | 449 | 717 | 520 |
| 1/4/20xx | 5.42 | 192 | 211 | 352 | 296 |
| 1/5/20xx | 5.01 | 273 | 306 | 492 | 299 |
| 1/6/20xx | 3.19 | 255 | 269 | 418 | 228 |
| 1/7/20xx | 5.79 | 202 | 223 | 346 | 195 |
| 1/8/20xx | 7.67 | 339 | 357 | 588 | 357 |
| 1/9/20xx | 5.44 | 320 | 334 | 647 | 331 |
| 1/10/20xx | 8.43 | 396 | 425 | 655 | 392 |

TABLE 2-continued

Top-7 counters (anonymized samples) that correlate with Call-Drop KPI

| | | | | | |
|---|---|---|---|---|---|
| 1/11/20xx | 8.48 | 204 | 220 | 328 | 189 |
| 1/12/20xx | 9.59 | 307 | 331 | 506 | 361 |
| 1/13/20xx | 4.26 | 272 | 287 | 471 | 257 |
| 1/14/20xx | 3.19 | 173 | 173 | 288 | 168 |
| 1/15/20xx | 5 | 273 | 300 | 506 | 226 |

| Date Time | RrcReEstSuccessPSDLRlcUncErr | IuRelReqPsDlHSD | RBReconfigureReqRbPsHSDDlHSUU1 |
|---|---|---|---|
| 12/30/20xx | 280 | 865 | 28361.6 |
| 12/31/20xx | 334 | 797 | 26329.6 |
| 1/1/20xx | 290 | 648 | 26567.1 |
| 1/2/20xx | 441 | 1656 | 39377.5 |
| 1/3/20xx | 507 | 1513 | 32911.5 |
| 1/4/20xx | 278 | 698 | 26715.6 |
| 1/5/20xx | 288 | 786 | 34936 |
| 1/6/20xx | 223 | 592 | 29164.5 |
| 1/7/20xx | 188 | 504 | 25033.36 |
| 1/8/20xx | 341 | 1115 | 42721.47 |
| 1/9/20xx | 317 | 887 | 29833.6 |
| 1/10/20xx | 380 | 1174 | 36095.28 |
| 1/11/20xx | 180 | 500 | 20161.85 |
| 1/12/20xx | 347 | 978 | 33698.21 |
| 1/13/20xx | 252 | 769 | 29582.08 |
| 1/14/20xx | 164 | 422 | 15208.5 |
| 1/15/20xx | 222 | 695 | 29066.4 |

Note: In the above table, the mean (average) value (over one hour duration) is taken over a period of 2 weeks considering the busy hours only. Depending on the nature of the KPI and counters, the counters picked to employ this approach may change.

In one embodiment, the system may be configured to enable Random Forests approach to identify the top-"N" most contributing counters and it provides a range-wise flow-chart view. However, this technique requires one value per contributing counter and not a 'range'.

In the next step, the system is configured to identify Correlation Coefficients. For this purpose, initially, the system is configured to generate the plot of top-N contributing counters using correlation. The table 3 shows the correlation coefficients of the top-7 counters for the call-drop KPI.

TABLE 3

Top-7 correlated counters (anonymized samples) with PS-Call-Drop KPI.

| KPI/Counters | Correlation Coeff |
|---|---|
| PSCall-Drop | 1 |
| RABDropPSCellDCHNbRncDCH_HS | 0.671478 |
| IuRelReqPsNRncPerULRbR99 | 0.670866 |
| RBReconfigFailNbRncTimeout | 0.670727 |
| IuRelReqPsUserInactivity | 0.660944 |
| IuRelReqPsNrncOtherCause | 0.652093 |
| RABDropPSCellDCHRelProcNbRncIuRelReq | 0.638864 |
| IuRelReqPsNrncConn-Ue-Lost | 0.620081 |
| IuRelReqPsNrncD1RLCErrTRB | 0.604736 |
| IuormRelReqPsNrncD1HSD | 0.594576 |

Further, the system is configured to Model the Call-Drop KPI. For this purpose, Regression modelling is applied on the top 7 counters in-order to model the Call-Drop-KPI. The Regression models such as RANSAC, Ridge and Bayes may be used for the purpose of modelling. In one embodiment, the regression model is selected based on how 'responsive' the prediction has to be and this would vary depending on the KPI the user wants to model.

The system may use Ridge Regression for Call-Drop KPI using the top-7 contributing counters. The coefficients generated using Ridge Regression is represented in table 4.

TABLE 4

Regression Coefficients of Top-7 contributors (anonymized samples) of Call-Drop KPI

| Top-N Counters | Coefficient |
|---|---|
| HSDmobHSDToHSD | 0.0093089 |
| HSDIuRelmobFailure | 0.013546 |
| RBReconfigFailure | −0.0034257 |
| RrcReEstAttemptPSDLR1cUncErr | 0.043767 |
| RrcReEstSuccessPSDLR1cUncErr | −0.047354 |
| IuRelReqPsD1HSD | 0.0027637 |
| RBReconfigureReqRbPsHSDD1HSUU1 | −0.00013486 |

In one embodiment, the system is configured to sort the top "N" contributors of a Call-Drop KPI and determine coefficients of influence determined from historic data. Finally, the system may also enable a graphical user interface to enable the user to vary the top "N" contributors and predict the effects of this variation over the KPI. Further, the network implementation of system configured for predicting Key Performance Indicator (KPI) in a telecommunication network is illustrated with FIG. 1.

Referring now to FIG. 1, a network implementation 100 of a system 102 for predicting Key Performance Indicator (KPI) in a telecommunication network is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a server. Further, the system 102 may be implemented in a cloud network. In one embodiment, the system may be implemented as a Platform as a Service (PaaS). The system 102 may further be configured to communicate with any telecommunication network 108 and gather data associated with the counters in the telecommunication network 108.

Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Hypertext Transfer Protocol Secure (HTTPS), File Transfer Protocol (FTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like. In one embodiment, the system 102 may be configured to receive data from the telecommunication network 108. The data may be received in the form of performance corresponding to each counter from a set of counters associated with the telecommunication network 108. Though the working of system 102 is illustrated with reference to telecommunication network 108, the system 102 may also be configured for KPI prediction of other communication networks such as the network 106. Once the system 102 receives the data, the system 102 is configured to process the data as described with respect to FIG. 2.

Figure 2:
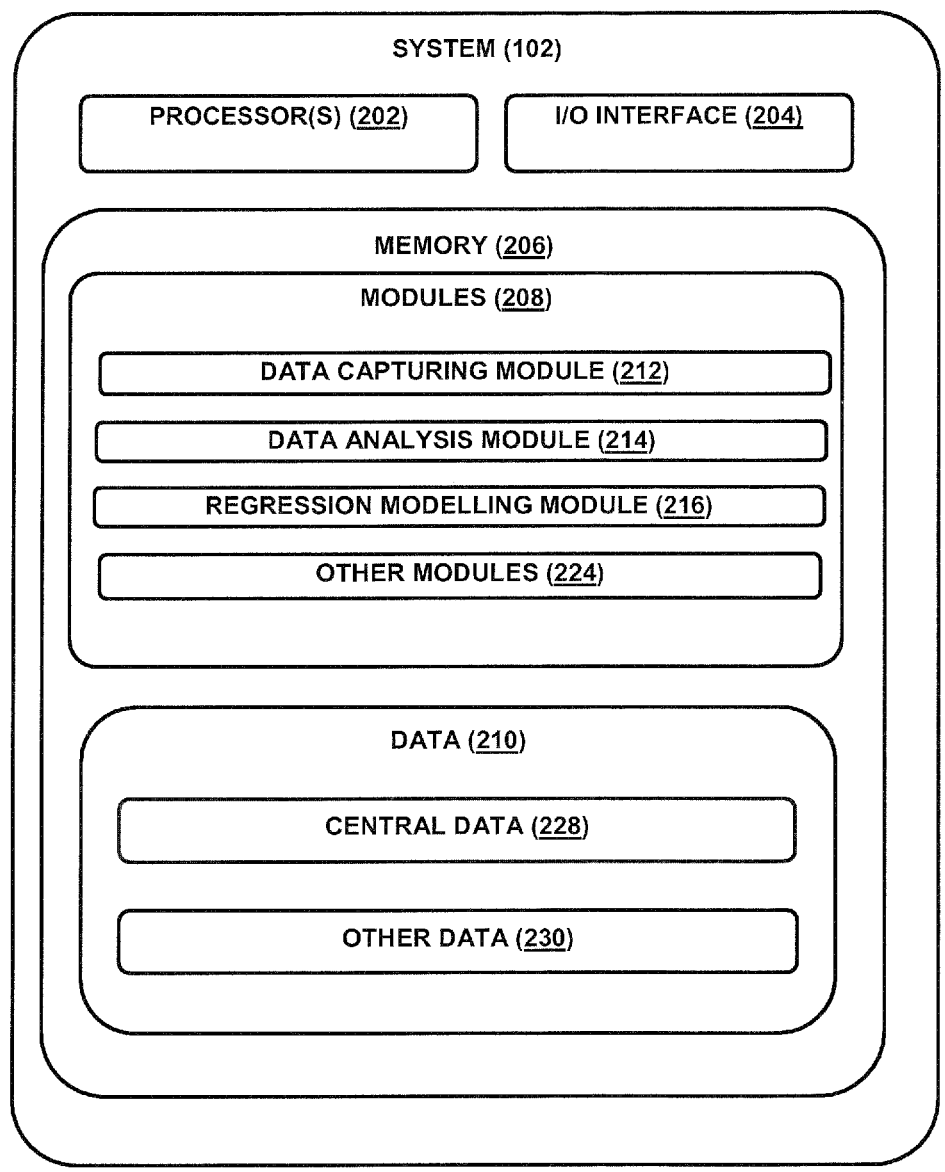
FIG. 2 illustrates the system configured for predicting a Key Performance Indicator (KPI) in a telecommunication network, in accordance with an embodiment of the present subject matter.

Referring now to FIG. 2, the system 102 is configured for predicting Key Performance Indicator (KPI) in a telecommunication network in accordance with an embodiment of the present subject matter. In one embodiment, the system 102 may include at least one processor 202, an input/output (I/O) interface 204, and a memory 206. At least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the modules 208 may be configured to perform functions of the speech controller, visual face recognition & controller, and modulation & frame decomposer. The module 208 may include a data capturing module 212, a data analysis module 214, a regression modelling module 216, and other modules 224. The other modules 224 may include programs or coded instructions that supplement applications and functions of the system 102.

The data 210, amongst other things, serve as a repository for storing data processed, received, and generated by one or more of the modules 208. The data 210 may also include a central data 228, and other data 230. In one embodiment, the other data 230 may include data generated as a result of the execution of one or more modules in the other modules 224. In one implementation, a user may access the system 102 via the I/O interface 204. The user may be registered using the I/O interface 204 in order to use the system 102. In one aspect, the user may access the I/O interface 204 of the system 102 for obtaining information, providing input information or configuring the system 102. The functioning of all the modules in the system 102 is described as below:

Data Capturing Module 212

In one embodiment, the data capturing module 212 is configured for monitoring a set of counters and a Key Performance Indicator (KPI), corresponding to a telecommunication network. In one embodiment, the set of counters correspond to a set of factors influencing the KPI. The KPI may be selected by the user of the system 102 using the user device 104. In one embodiment, the system data capturing module 212 may analyse the data captured from the telecommunication network 108 to determine one or more vulnerable KPIs. For example, a Call-Drop KPI for the cell-of-interest in a telecommunication network may be selected by the system. The set of counters and a Key Performance Indicator (KPI) is monitored for a predefined time interval to gather sampling data.

Data Analysis Module 214

In one embodiment, the data analysis module 214 is configured to analyse the sample data using a data analysis technique to identify a subset of counters, from the set of counters, influencing the KPI. The data analysis technique is one of correlation technique or covariance techniques known in the art.

Further, the data analysis module 214 is configured to identify a correlation coefficient associated with each counter from the subset of counters. The correlation coefficient is a numeric value computed based on impact of each counter from the subset of counters on the KPI. Prior to applying the correlation logic, this module also takes care of transformation of data so that the counters are appropriately normalized. In one embodiment, the counters may have different units. Some counters may be in mill watts, some in decibels, and some in kilobits/sec. Hence, the counters need to be scaled appropriately before applying correlation. For this purpose, normalization is applied on the subset of counters to bring all the counters on to a notionally common scale.

Regression Modelling Module 216

In one embodiment, the Regression Modelling Module 216 is configured to applying regression models on subset of counters and the KPI in order to build a correlation equation between the subset of counters and the KPI. The Regression models such as RANSAC, Ridge and Bayes may be used for the purpose of modelling. In one embodiment, the regression model is selected based on how 'responsive' the prediction has to be and this may vary depending on the KPI the user wants to model. The correlation equation enables a user in forecasting and predicting the performance of the KPI. The method for predicting Key Performance Indicator (KPI) in the telecommunication network 108 is illustrated with respect to the flowchart of FIG. 3.

Figure 3:
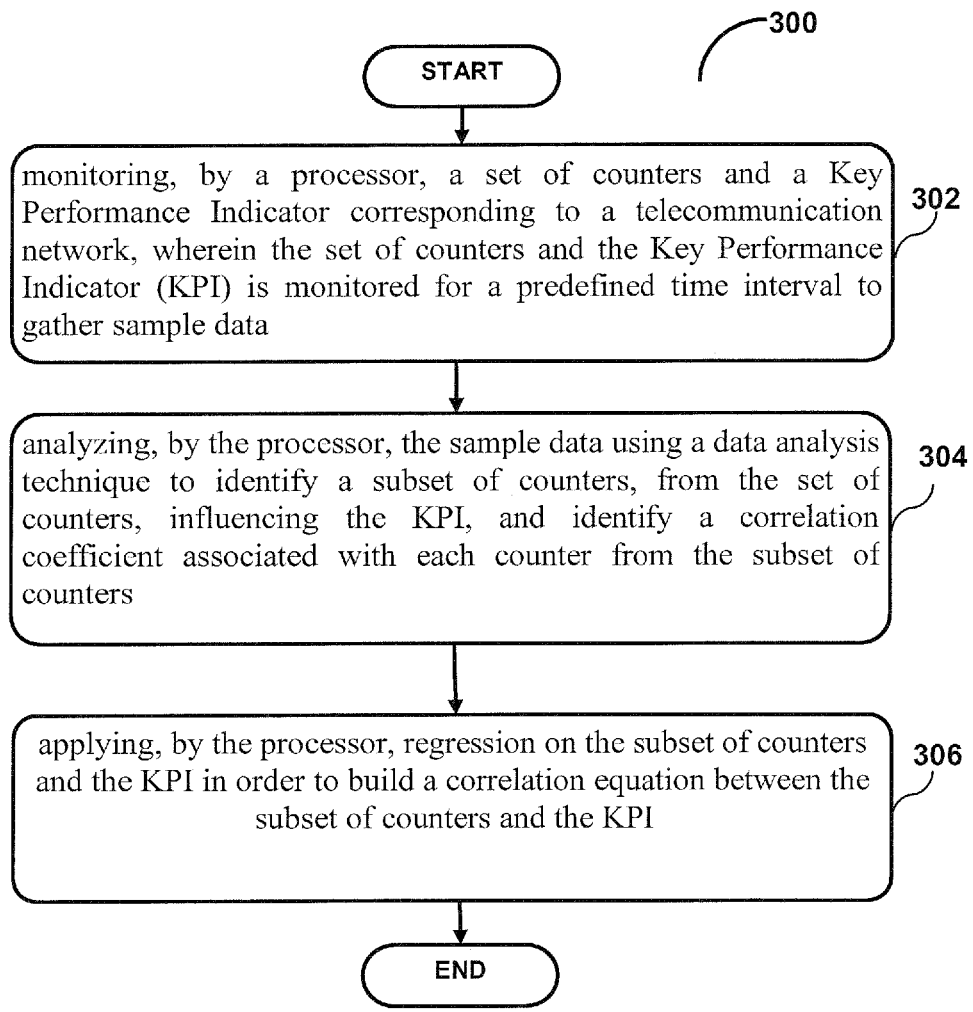
FIG. 3 illustrates a method for predicting a Key Performance Indicator (KPI) in a telecommunication network, in accordance with an embodiment of the present subject matter.

Referring now to FIG. 3, a method 300 for predicting Key Performance Indicator (KPI) in the telecommunication network 108, is disclosed in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, the data capturing module 212 is configured for monitoring a set of counters and a Key Performance Indicator (KPI), corresponding to a telecommunication network. In one embodiment, the set of counters correspond to a set of factors influencing the KPI. The KPI may be selected by the user of the system 102 using the user device 104. In one embodiment, the system data capturing module 212 may analyse the data captured from the telecommunication network 108 to determine one or more vulnerable KPIs. For example, a Call-Drop KPI for the cell-of-interest in a telecommunication network may be selected by the system. The set of counters and a Key Performance Indicator (KPI) is monitored for a predefined time interval to gather sampling data.

At block 304, the data analysis module 214 is configured to analyse the sample data using a data analysis technique to identify a subset of counters, from the set of counters, influencing the KPI. The data analysis technique is one of correlation technique or covariance techniques known in the art which is performed post normalization of the counter dataset. In one embodiment, the counters may have different units of measurement. Some counters may be in mill watts, some in decibels, and some in kilobits/sec. Hence, the counters need to be scaled appropriately before applying correlation. For this purpose, normalization is applied on the subset of counters to bring all the counters on to a notionally common scale.

Further, the data analysis module 214 is configured to identify a correlation coefficient associated with each counter from the subset of counters. The correlation coefficient is a numeric value computed based on impact of each counter from the subset of counters on the KPI.

At block 306, the Regression Modelling Module 216 is configured to applying regression models on subset of counters and the KPI in order to build a correlation equation between the subset of counters and the KPI. The Regression models such as RANSAC, Ridge and Bayes may be used for the purpose of modelling. In one embodiment, the regression model is selected based on how 'responsive' the prediction has to be and this may vary depending on the KPI the user wants to model. The correlation equation enables a user in forecasting and predicting the performance of the KPI.

Figure 4:
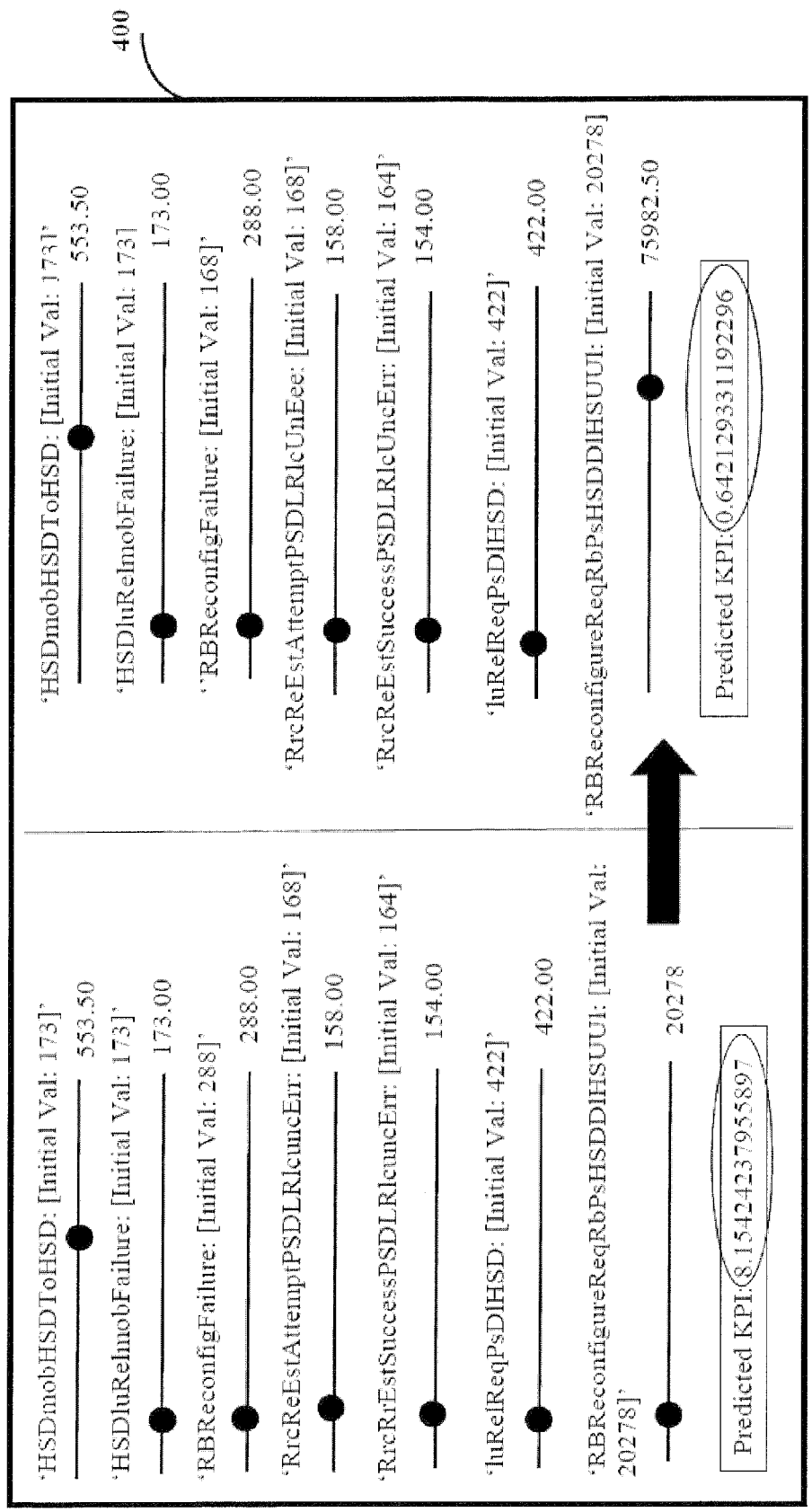
FIG. 4 illustrates a graphical user interface, in accordance with an embodiment of the present subject matter.

As represented in FIG. 4, the system may generate a graphical user interface 400 to enable a user to vary the top "N" contributors and predict the effects of this variation over the KPI. As represented in FIG. 4, it is evident that when the counter: ReconfigurePS HSD to HSU is increased, the Call-Drop KPI decreases which suggests that it would make sense to configure CM parameters that would facilitate this transition. With a simple scrolling input, the graphical user interface may provide options to answer questions around Network Operations.

Although implementations for systems and methods for predicting Key Performance Indicator (KPI) in the telecommunication network 108 has been described, it is to be understood that the appended claims are not necessarily limited to the specific features or methods described. Rather, the specific features and methods are disclosed as examples of implementations for predicting Key Performance Indicator (KPI) in the telecommunication network.

I claim:

1. A method for predicting Key Performance Indicator (KPI) in a telecommunication network, the method comprising steps of:
    monitoring, by a processor, a set of counters and a Key Performance Indicator, corresponding to a telecommunication network, wherein the set of counters and the KPI are monitored for a predefined time interval to gather sample data;
    analyzing, by the processor, the sample data using a data analysis technique to:
    identify a subset of counters, from the set of counters, influencing the KPI, and
    identify a correlation coefficient associated with each counter from the subset of counters, wherein the correlation coefficient associated with each counter is identified after normalizing the subset of counters; and
    applying, by the processor regression models on the subset of counters and the KPI in order to build a correlation equation between the subset of counters and the KPI, wherein a regression model is selected based on how responsive a prediction has to be which varies depending on a KPI a user wants to model,
    forecasting and predicting performance of a KPI using the correlation equation.

2. The method of claim 1, wherein the set of counters correspond to a set of factors influencing the KPI.

3. The method of claim 1, wherein the KPI corresponds to a user selected performance indicator associated with the telecommunication network.

4. The method of claim 1, wherein the data analysis technique is one of: a correlation technique or covariance techniques performed after data normalization.

5. The method of claim 1, wherein the correlation coefficient is a numeric value computed based on impact of each counter from the subset of counters on the KPI.

6. The method of claim 1, wherein regression technique selected from RANdom Sample Consensus (RANSAC), Ridge and Bayes, and wherein the regression technique is applied on the subset of counters and the KPI in order to build an equation between the subset of counters and the KPI.

7. A system for predicting Key Performance Indicator (KPI) in a telecommunication network, the system comprising: a memory;
a processor coupled to the memory, wherein the processor is configured to execute programmed instructions stored in the memory for:
monitoring a set of counters and a KPI, corresponding to a telecommunication network, wherein the set of counters and the KPI are monitored for a predefined time interval to gather sample data;
analyzing the sample data using a data analysis technique to:
identify a subset of counters, from the set of counters, influencing the KPI, and
identify a correlation coefficient associated with each counter from the subset of counters, wherein the correlation coefficient associated with each counter is identified after normalizing the subset of counters; and
applying regression models on the subset of counters and the KPI in order to build a correlation equation between the subset of counters and the KPI, wherein a regression model is selected based on how responsive a prediction has to be which varies depending on a KPI a user wants to model,
forecasting and predicting performance of a KPI using the correlation equation.

8. The system of claim 7, wherein the set of counters correspond to a set of factors influencing the KPI.

9. The system of claim 7, wherein the KPI corresponds to a user selected performance indicator associated with the telecommunication network.

10. The system of claim 7, wherein the data analysis technique is one of: a correlation technique or covariance techniques.

11. The system of claim 7, wherein the correlation coefficient is a numeric value computed based on impact of each counter from the subset of counters on the KPI after performing data normalization.

12. The system of claim 7, wherein a regression technique selected from RANdom Sample Consensus (RANSAC), Ridge and Bayes, wherein the regression technique is applied on the subset of counters and the KPI in order to build an equation between the subset of counters and the KPI.

13. A non-transitory computer readable medium embodying a program executable in a computing device for predicting Key Performance Indicator (KPI) in a telecommunication network, the computing device executing the program comprising:
a program code for monitoring a set of counters and a Key Performance Indicator, corresponding to a telecommunication network, wherein the set of counters and the KPI are monitored for a predefined time interval to gather sample data;
a program code for analyzing the sample data using a data analysis technique to: identify a subset of counters, from the set of counters, influencing the KPI, and identify a correlation coefficient associated with each counter from the subset of counters, wherein the correlation coefficient associated with each counter is identified after normalizing the subset of counters; and
a program code for applying regression models on the subset of counters and the KPI in order to build a correlation equation between the subset of counters and the KPI, wherein a regression model is selected based on how responsive a prediction has to be which varies depending on a KPI a user wants to model,
a program code for forecasting and predicting performance of a KPI using the correlation equation.

* * * * *